Figure 6:
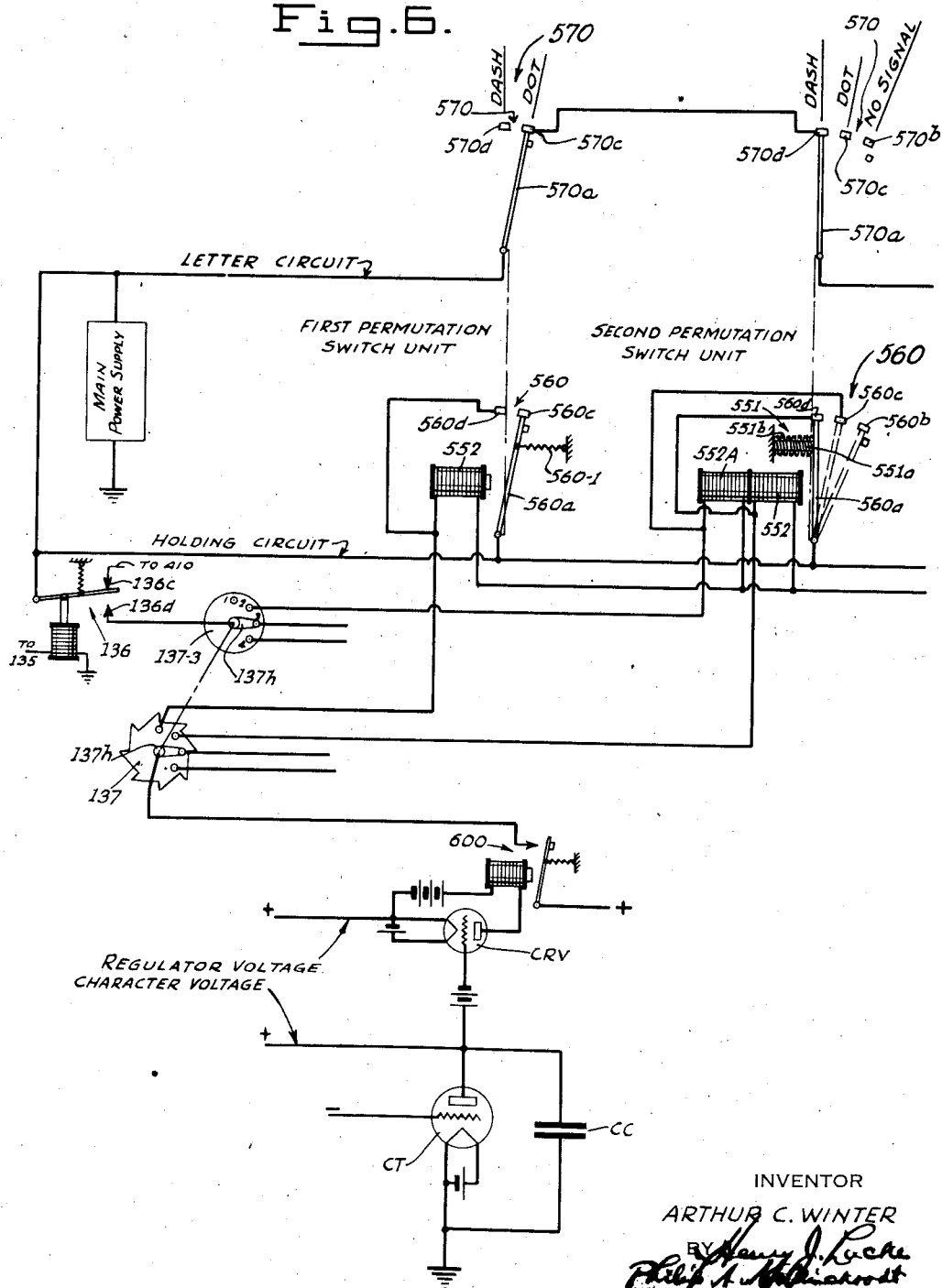

Sept. 11, 1945.  A. C. WINTER  2,384,514
CODE-CONTROLLED APPARATUS
Filed Dec. 28, 1943  4 Sheets-Sheet 1
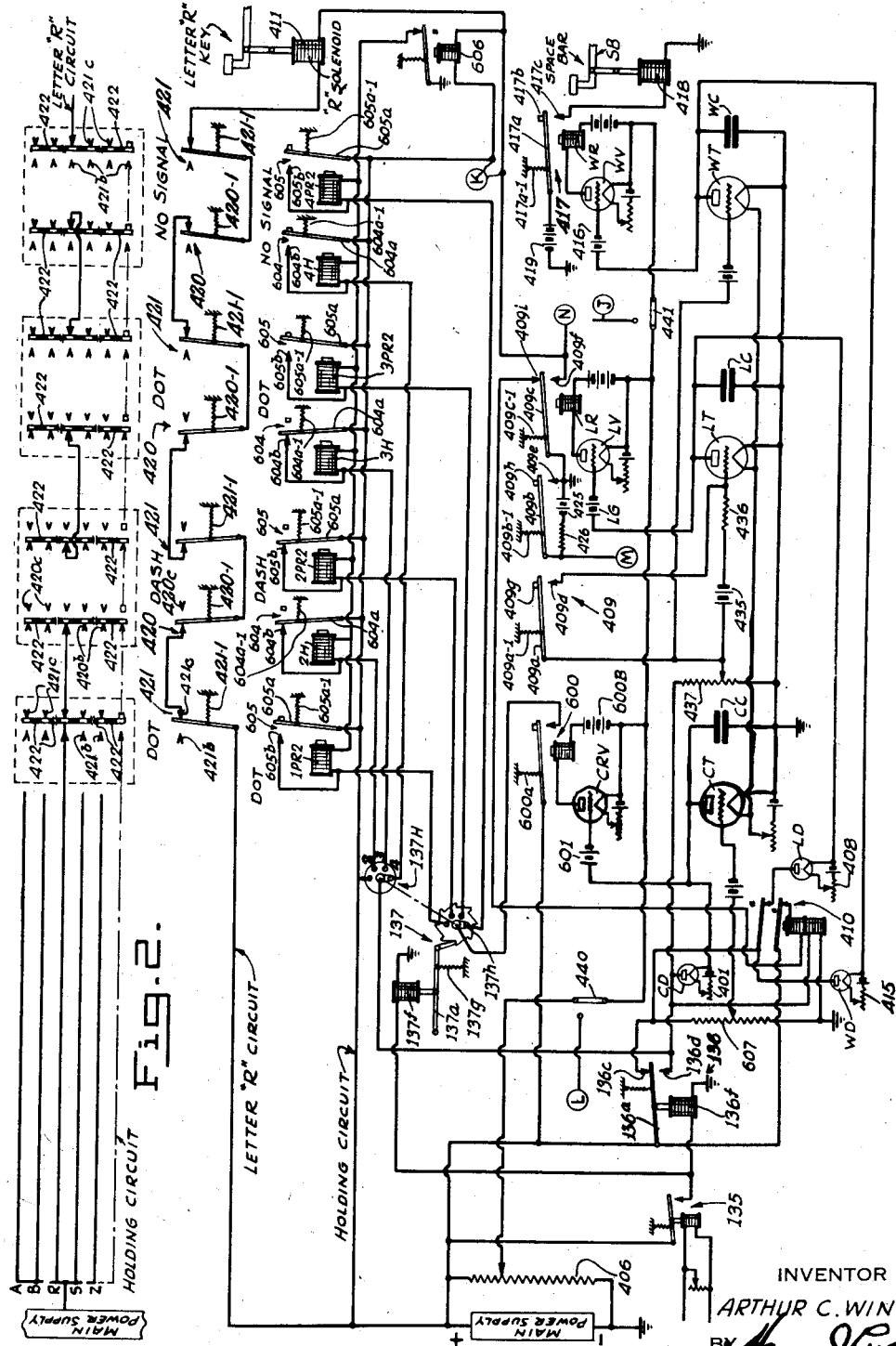
INVENTOR
ARTHUR C. WINTER
BY
ATTORNEYS Sept. 11, 1945. A. C. WINTER 2,384,514
CODE-CONTROLLED APPARATUS
Filed Dec. 28, 1943 4 Sheets-Sheet 2
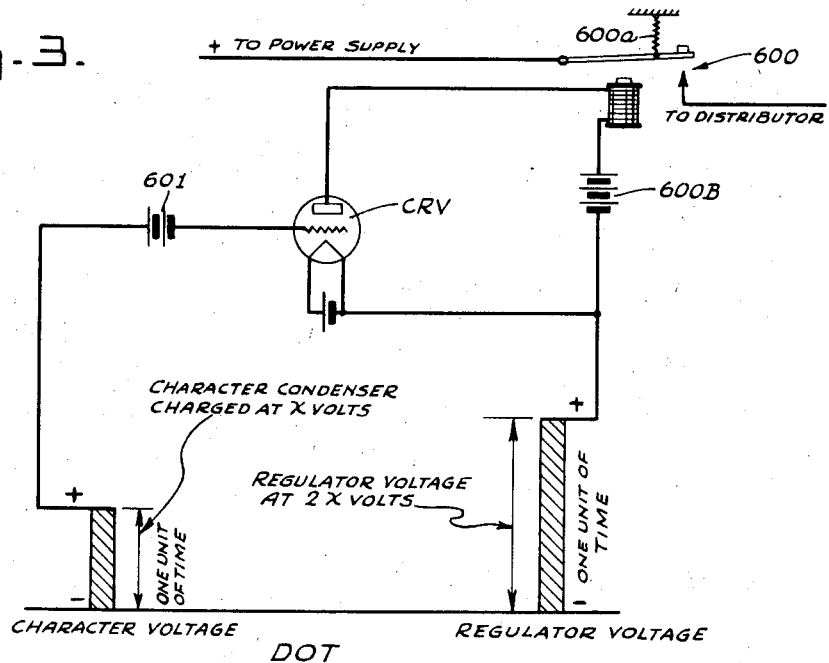
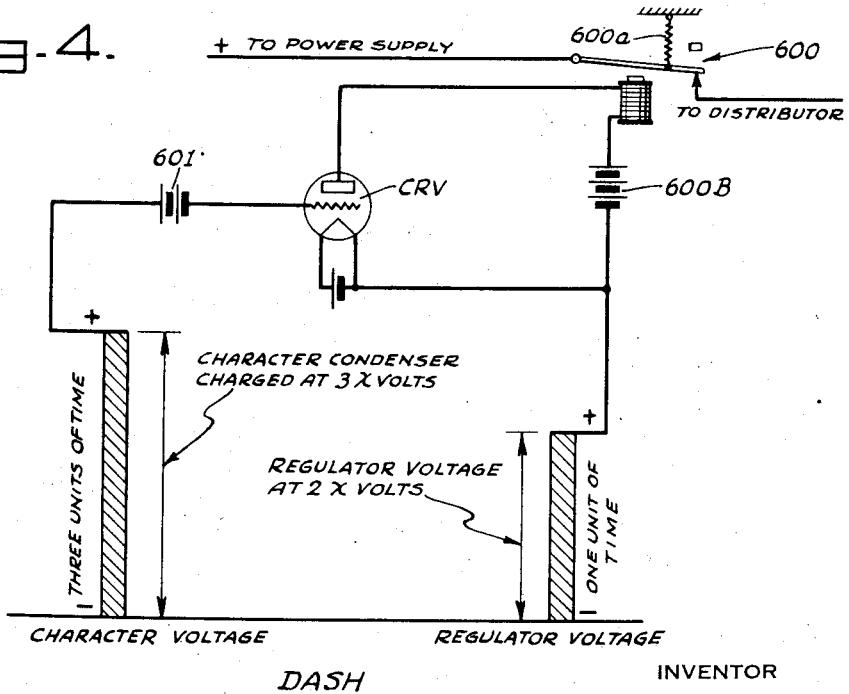
INVENTOR
ARTHUR C. WINTER
BY
ATTORNEYS

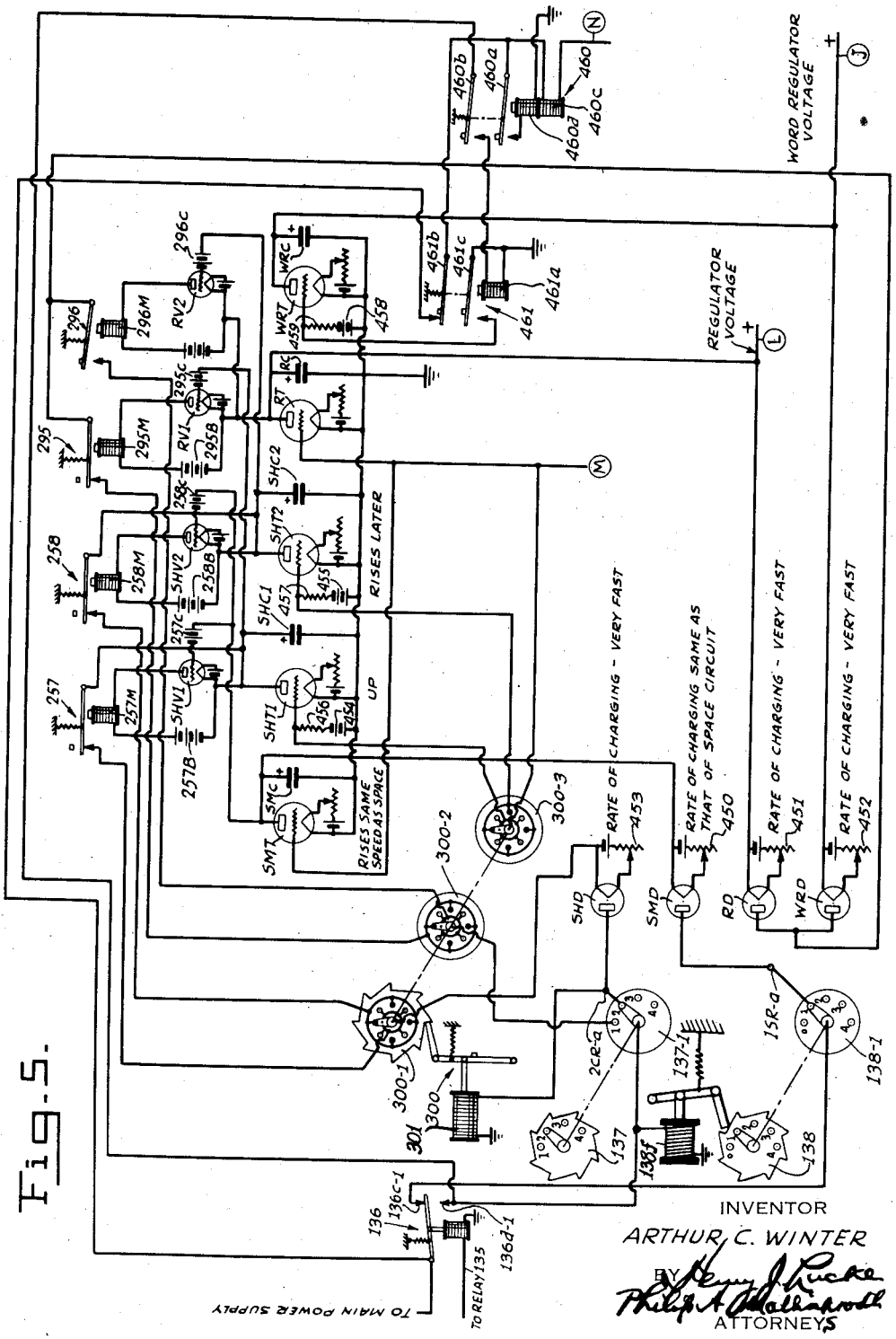

Patented Sept. 11, 1945

2,384,514

UNITED STATES PATENT OFFICE 2,384,514

CODE-CONTROLLED APPARATUS

Arthur C. Winter, Teaneck, N. J., assignor of onetenth to Henry J. Lucke, East Orange, N. J., and one-twentieth to Philip A. Mallinckrodt, Salt Lake City, Utah Application December 28, 1943, Serial No. 515,956

9 Claims. (Cl. 178—26)

This invention relates to code-controlled apparatus, and constitutes an improvement on the inventions illustrated and described in my copending application Serial No. 399,766, now U. S. Patent No. 2,338,692, dated January 4, 1944, and in my copending application Serial No. 515,952, filed on the same date as this present application, and similarly entitled "Code-controlled apparatus."

The primary object of the present improvement is the elimination of a considerable quantity of equipment necessitated by the earlier forms of the invention, without detracting from the operative capacity and versatility and without reducing the operative accuracy of the apparatus.

In this way, not only is the apparatus reduced in size and weight, but the initial cost and upkeep expenses are also considerably lessened.

Outstanding in the accomplishing of the above is the use of a single, modified translating unit in place of the plurality of sequentially arranged translating units of the prior embodiments, and the elimination from such modified translating unit of much of the equipment necessary in the prior embodiments.

The present invention is, in principle, very similar to those of the prior patent applications. However, instead of directly measuring the length of each short code-space following the reception of a code-signal, and comparing the measured short code-spaces with the respective immediately preceding code-signals, the regulator is employed as a measure of the length of a short codespace. The respective measured code-signals are compared with it to produce respective resultant actions determinative of dot or of dash reactions.

If the apparatus is arranged to be regulated manually, an attendant must stand watch and reset the regulator every time improper results indicate a change in speed of code transmission with a consequent change in length of the short code-spaces. This is necessary because the regulator must at all times furnish an accurate measurement of the short type of code-spaces occurring between code-signals in the received code.

If the apparatus is arranged to be regulated automatically, a positive measurement of the first short code-space occurring in any group of successive code-signals is recorded and retained as a reference value to which the regulator is adjusted for the next succeeding group of successive code-signals. Thus, the regulator always constitutes a positive measurement of that short codespace which occurs first in the immediately preceding group of successive code-signals.

The regulator is arbitrarily assigned a certain relative value (here considered to be 2X), which represents a convenient relative time period (here considered to be one unit of time to accord with the relative time-length of a short code-space in the Continental radiotelegraph code), and the measured code-signals are respectively compared with this regulator measurement value to determine whether they are long or short, respectively, relative thereto.

The permutation or settable device of the apparatus is supplied with sets of paired permutation elements, the number of pairs in a set corresponding to the number of code-signals in the largest single group of successive code-signals which the apparatus will be called upon to handle, all as in the prior inventive embodiments. Here, however, each pair of permutation elements in any set is adjusted or set by the single translating unit. This one translating unit serves, then, to variably adjust or set the entire permutation device in accordance with the various resultants produced by comparing received code-signals with the regulator.

Space-timing and release of the apparatus are accomplished much as in the prior inventive embodiments, the regulator providing the necessary standard reference value.

Further objects and features of the invention will be apparent in the following detailed description of the preferred forms illustrated in the accompanying drawings.

In the drawings, which specifically illustrate preferred code-controlled apparatus for converting a radio-telegraph message in Continental code to typewritten English language by the use of electrical voltage and electronic equipment:

Fig. 1 is a wiring diagram representing the apparatus as arranged for manual control of the speed regulator;

Fig. 2, a top plan, diagrammatic view of the permutation part of the apparatus as illustrated in Fig. 1;

Fig. 3, a diagrammatic representation of the voltage relationship existing in the translating unit of Fig. 1 when a dot is the signal translated;

Fig. 4, a diagrammatic representation similar to that of Fig. 3, but illustrating the voltage relationship when a dash is the signal translated;

Fig. 5, a wiring diagram illustrating apparatus which may be added to the apparatus of Fig. 1 for adjusting the speed regulator automatically; and Fig. 6, a wiring diagram illustrating an alternative form of permutation device for use with the other parts of Fig. 1.

The translating unit

The translating unit of the apparatus comprises a condenser CC for receiving and storing current which, in quantity (that is, by the voltage exerted across the condenser), provides a measure of a received code-signal.

The condenser CC is charged at a predetermined time-rate by the main power supply (labeled such), feeding through the diode CD, at such times as the arm 136a of double-keying relay 136 is in engagement with its code-signal or character contact 136d, as differentiated from its code-space contact 136c. It will be noted that the arm 136a of the double-keying relay is in this position when the solenoid 136f of the double-keying relay is energized, the latter occurring when the code-receiving relay 135 is energized by reason of the reception by the apparatus of a code-signal. Thus, it can be seen that every time a code-signal is received by the apparatus, the condenser CC of the single translating unit is charged accordingly.

A triode CRV is provided in the translating unit for comparing respective voltages across the condenser CC with the regulator voltage. Such triode has filament, grid, and plate circuits, a sensitive relay 600 being disposed in the plate circuit and serving as the means responsive to the resultant of the comparing action. The sensitive relay 600 is normally held open by a spring 600a, but a battery 600B stands ready with power to close it when favorable conditions within the triode permit current to flow in the plate circuit. The positive side of the condenser CC is electrically connected to the grid of the triode through grid battery 601.

Regulator voltage is provided from the main power supply through a rheostat 406 when the apparatus is arranged for manual regulation. The rheostat is adjusted manually from time to time during operation of the apparatus to accord with changes in speed of code transmission.

The rheostat 406 is electrically connected with the filament circuit of the triode CRV, impressing regulator voltage thereon. It will be remembered that the positive side of the condenser CC is electrically connected to the grid of the triode, impressing code-signal measurement voltage thereon when the condenser is charged. The grid of the triode is normally negatively biased, by the grid-battery 601, to such an extent that no effective current flows in the plate circuit when the code-signal measurement voltage (or, for short, character voltage) is equal to the regulator voltage, although the sensitive relay 600 is placed in critical condition tending to close at the slightest increase in flow (effective flow) of plate current due to a lessening of the grid bias. This occurs when the character voltage becomes greater than the regulator voltage.

The diode CD is set, in this instance, to charge the condenser CC at the rate of X volts in one unit of time. This is accomplished by properly adjusting the variable resistance 401 in the filament circuit of the diode. Thus, for a dot signal, one unit of time in length, the character voltage value would be X volts, while the regulator voltage value is 2X volts. This means that the grid bias of the triode CRV would be relatively greater than normal, and that no effective plate current would flow in the plate circuit thereof. The relay 600 would remain open. But, for a dash signal, three units of time in length, the character voltage value would be 3X volts, while the regulator voltage value is 2X volts. This means that the grid bias of the triode CRV would be less than normal, and that effective plate current would flow in the plate circuit thereof. The relay 600 would close under these circumstances.

The above-discussed voltage relationships are well illustrated in Figs. 3 and 4, respectively.

Permutation device

Permutation is accomplished by a device structurally similar to that set forth in my aforereferred to copending patent application Serial No. 515,952. Functionally, however, there is an important difference.

Of any one of the several paired switches 420 and 421 making up each serially related set thereof, only one switch is controlled by the translating unit. As here shown, that switch is the one designated 421.

The switches 421 of any set are normally held closed, relative to their respective contacts 421c, by means of their respective springs 421—1. They are opened relative to these contacts and closed relative to their respective contacts 421b whenever the respective master relay coils 1PR2, 2PR2, 3PR2, and 4PR2 are energized. Energization of a particular one of these master relay coils occurs whenever sensitive relay 600, associated with the triode CRV, is closed by reason of the triode registering a dash for any received code-signal.

The particular master relay coils are selected in accordance with the incoming code by means of an electrical distributor arrangement embodying a step-switch identical with that designated 137 in the prior inventive embodiment. Accordingly, this step-switch is here, also, designated 137.

The step-switch 137 has four contact points 1, 2, 3, 4, arranged to be engaged successively by the contact finger 137h. The successive contact points 1, 2, 3, and 4 are electrically connected, respectively, with the successive master relay coils 1PR2, 2PR2, 3PR2, and 4PR2. The contact finger 137h rests on the #1 contact point during the reception of the first code-signal in any group of successive code-signals. As the successive code-signals of the group occur, coil 137f of the step-switch 137 is energized, placing the switch-arm 137a in position to advance the step-switch successively by one step, through the action of spring 137g, when the successive code-spaces of the group are received. Thus, the translating unit is connected successively with each of the paired switch units of the permutation device, from the first on down the line, during the reception of any group of successive code-signals.

The switches 420 of any set are controlled independently of the translating unit. They are actuated, that is, opened relative to their respective contacts 420c, against which they are normally held by respective springs 420—1, and closed relative to their respective contacts 420b, whenever respectively corresponding code-signals are received by the apparatus. They are so actuated merely because of the fact that respectively corresponding code-signals are received by the apparatus, irrespective of any operation of the translating unit. They thereby merely indicate that respectively corresponding code-signals have been received, and thus provide for "no-signal" indications by such, if any, of the paired switch units of any set of same for which no respectively corresponding code-signals have been received.

For the above purpose, an auxiliary distributor is provided. It comprises a step-switch 137H, auxiliary to the main step-switch 137 and advantageously made part thereof, being mechanically connected thereto, so as to be actuated simultaneously therewith, but being electrically insulated therefrom. The #1 contact is a blank, and is not connected to any circuit. The #2 contact is electrically connected to the master relay coil associated with the switches 420 of the first paired switch units of the permutation device; the #3 contact to the master relay coil associated with the switches 420 of the second paired switch units; and so forth down the line. These master relay coils are, for convenience, here designated 2H, 3H, and 4H, respectively. Since the contact finger of the auxiliary stepswitch 137H is electrically connected with the contact 136d of the double-keying relay 136, power will be routed to the selected one of the respective master relay coils 2H, 3H, and 4H, whenever a code-signal is received by the apparatus.

It should be noted that both the set of master relay coils 1PR2, 2PR2, 3PR2, and 4PR2, and the set of master relay coils 2H, 3H, and 4H are arranged in such manner that they remain magnetized following initial energization, so that the permutation device registers the received code until the ultimate action or end result occurs (here the typing out of a letter corresponding to the group of successive code-signals, or, for the letters "E" and "T," to the single codesignal).

For the purpose, a holding circuit is provided. It is labeled as such in Fig. 1, and is illustrated just below the letter circuits. The paired switch units 604 and 605 of this holding circuit correspond to the paired switch units 420 and 421. They are mechanically connected therewith but electrically insulated therefrom. They are controlled by the same master relay coils 1PR2, 2H and 2PR2, 3H and 3PR2, and 4H and 4PR2, respectively. They are wired as illustrated, so that when their respective switch-arms 604a and 605a are closed relative to their contacts 604b and 605b, respectively, the respective master relay coils are locked in energized condition and do not become de-energized until the holding circuit is positively broken at relay 606.

There is only one holding circuit in the permutation device, but there are as many letter or other symbol circuits as there are letters or other symbols which it is desired the apparatus be capable of printing.

Each set of paired switch units making up a letter circuit is wired to correspond to the code representing a particular letter or other symbol. In Fig. 1 is illustrated that set of paired switch units or letter circuit which is wired to correspond to the group of successive code signals—dot dash dot (. _ .)—representing the letter "R."

Printing device

As fully explained in the afore-mentioned copending patent application Serial No. 515,952, each set of paired switch units is insulated from the others by electrical insulating material 422, Fig. 2, and, when properly set by corresponding received code-signals, provides a closed electrical circuit from the main power supply to the solenoid associated with the particular key concerned in the printing device.

The printing device is advantageously a typewriter of standard make having solenoids arranged to actuate the respective keys thereof. Only the key for the letter "R" is here illustrated, because the apparatus is shown as having just received the group of successive code-signals which represent the letter "R." This key is arranged to be actuated by the solenoid 411.

Space-timing

Spacing of letters from other letters, and words from other words, is accomplished by the present apparatus in the same manner as set forth in the aforementioned copending patent application Serial No. 515,952. For the sake of convenience, however, minor changes have been made in the circuit arrangements. These changes are merely alternative. Such changes may or may not be incorporated in the circuits in either instance.

As here illustrated, a letter condenser LC is arranged to be charged from the main power supply whenever double-keying relay 136 closes relative to its space contact 136c. Charging is accomplished through the diode electronic tube LD at a rate predetermined by the setting of the variable resistance 403, associated with the filament circuit of the diode. A holding relay 410 is provided for the purpose of closing the normally open circuit from the power supply to the letter diode LD upon the reception of the first code-signal following any release and resetting of the apparatus. The circuit is normally maintained open to guard against the feed of current to the letter condenser LC during such times as the apparatus is idle but ready and waiting to receive code.

The above corresponds exactly with what is set forth in my copending patent application Serial No. 515,952.

A triode electronic tube LV has its grid circuit (rather than its filament circuit) electrically connected to the positive side of the letter condenser LC. The grid is normally biased negatively by a grid-battery LG, but not sufficiently to prevent effective flow of current in the plate circuit of the triode when the regulator voltage and the voltage across letter condenser LC are approximately equal. A sensitive relay 409, which is in reality a triple-switch, is disposed in the plate circuit of the triode, and the filament circuit of the triode is electrically connected with the rheostat 406, that is, with the source of supply of regulator voltage.

Since the regulator voltage ordinarily increases the total negative biasing effect (regulator voltage added to grid-battery LG voltage) no current ordinarily flows in the plate circuit of the triode. Relay coil LR of the triple-switch 409 is unenergized, and switch arms 409a and 409b rest against the stops 409g and 409h, respectively, by action of their springs 409a—i and 409b—i, respectively (rather than because relay coil LR is energized as in the prior case), while relay arm 409c is held against its contact 409i, by action of its spring 409c—i.

When the letter condenser LC is charged to an extent such that its voltage approaches the regulator voltage in value, the restrictive effect of the regulator voltage is overcome, and current flows in the plate circuit of the triode. Relay coil LR is thereby energized, and switch-arms 409a, 409b, and 409c are closed relative to their contacts 409d, 409e, and 409f, respectively. The switch-arm 409c is made so that it is closed slightly in advance of the other two switch arms, so printing will occur slightly before release. Accordingly, printing of the letter registered by the permutation device takes place, as does also release and resetting of the apparatus, when arranged for automatic regulation, all as explained in the aforementioned copending patent application Serial No. 515,952.

Release or discharge of the condenser CC of the translating unit and release or discharge of the letter condenser LC takes place as described hereinafter.

Word spacing is accomplished substantially as explained in the prior application. A word condenser WC is arranged to be charged by the main power supply. Charging is accomplished through a word diode electronic tube WD at a rate determined by the setting of the variable resistance 415, associated with the filament circuit of the diode.

A triode electronic tube WV relates the voltage across the word condenser WC to the regulator voltage supplied by the variable resistance 406 in the same manner as does the triode LV for the voltage across the letter condenser. When such voltage across the word condenser approaches the regulator voltage in value, relay 417 is closed, thereby energizing solenoid 418 and actuating the space-bar SB of the typewriter.

Release

The several condensers CC, LC, and WC of this embodiment are discharged by means of thyratrons CT, LT, and WT, respectively.

The grid of thyratron CT is electrically connected to the voltage divider 607, which, in turn, is electrically connected to the space contact 136c of double-keying relay 136. Accordingly, since condenser CC is electrically connected to thyratron CT, it is discharged every time double-keying relay 136 closes relative to its space contact 136c, that is, every time a code-signal is followed by a code-space.

The grid of thyratron LT and the grid of thyratron WT are electrically connected to the voltage divider 437, which, in turn, is electrically connected to the character contact 136d of double-keying relay 136. Thus, since letter condenser LC is electrically connected to thyratron LT, and since word condenser WC is electrically connected to thyratron WT, they are discharged every time double-keying relay 136 closes relative to its character contact 136d, that is, every time a code-signal is received by the apparatus. The foregoing is true for functioning within letter groups however when a word is printed the letter condenser LC becomes discharged through letter thyratron LT as a result of the closing of triple-switch 409 wherein arm 409a closes with respect to contact 409d. This action removes that amount of grid bias to LT being furnished by battery 435. Resistor 436 protects battery 435 from becoming short circuited. Word thyratron WT not being associated with grid battery 435 is unaffected by the closing of triple-switch 409 and the voltage across word condenser WC continues to rise until it reaches the regulator voltage in magnitude. At that time plate current flows through the relay coil WR and causes relay switch arm 417a to close relative to its contact 417c. This action closes the circuit to solenoid 418 which holds space bar SB in its actuated position until the next character causes its release.

Release and resetting of step-switch 137 is accomplished by energization of the electro-magnet 430 whenever arm 409c of triple-switch 409 closes relative to its constant 409f. The electromagnet 430 and its associated step-switch release mechanism is illustrated in Fig. 3 of my copending application Serial No. 515,952, and described therein. Electro-magnet 430 is connected to the main circuit of Fig. 1 at the two points indicated by the letter K.

In addition, relay 606, which is a release relay in the holding circuit, opens the circuit of the holding relays IPR2, 2H, etc., upon being energized. This action releases the holding relays and the permutation switch-arms all return to their normal positions.

Automatic regulation

The apparatus is arranged for automatic regulation when the system of Fig. 5 is connected to the system of Fig. 1. This is accomplished by interconnecting the points J, L, M, N of the two systems, and by throwing the switches 440 and 441.

The automatic system is structurally and functionally identical with that illustrated and described in my afore-referred-to copending application, Serial No. 515,952, and will not be described in detail here, except to say that the triple alternator (300—2) circuit is wired to the #1 character contact of the step-switch 137—1 in Fig. 5. This permits the regulator voltage and word regulator voltage to rise during the beginning of the first character. Since the regulator voltage rises at a faster rate than the character voltage, no difficulty is experienced such as premature locking of the switch-arm 605a in the dash position.

A somewhat different embodiment of the invention is illustrated in Fig. 6. The only changes made are in the permutation device of the apparatus.

This embodiment corresponds to that of Figs. 18, 19, 20, and 21 of the afore-referred to copending application Serial No. 515,952. Similar added parts are identified by corresponding reference characters.

The translating unit of this embodiment is identical with that of the embodiment illustrated in Fig. 1 herein. It is equipped with a character condenser CC, a source of regulator voltage, and a triode CRV for comparing the character voltage corresponding to a received code-signal with the regulator voltage, which latter is a measure of a short code-space of the type occurring between code-signals in a group of successive code-signals. The sensitive relay 600 disposed in the plate circuit of the triode CRV is adapted to set the successive switch units of the permutation device according to whether a received code-signal is a dot or a dash.

The permutation device is here, as it is in Figs. 18, 19, 20 and 21 of the afore-referred-to copending application, made up of sets of sequentially aligned, single switch units. In this case, one of such sets is a holding circuit, while the remainder are letter or other symbol circuits.

Each single switch unit 560 (except the first) in the holding circuit has a switch-arm 560a arranged to engage an electrical contact 560b at the outward limit of its throw-stroke through the action of the respective compound springs 551, and to engage either one or the other of two electrical contacts 560c and 560d, within the limits of its throw-stroke, depending upon whether the triode CRV registers a dot or a dash. The first single switch unit 560 is arranged to normally engage an electrical contact 560c at the outward limit of its throw-stroke through the action of a return spring 560—1.

Likewise, each single switch unit 570 (except the first) in each letter or other symbol circuit has a switch-arm 570a arranged to engage an electrical contact 570b at the outward limit of its throw-stroke, depending upon whether the triode CRV registers a dot or a dash.

Each one of the groups of side-by-side mechanically connected, corresponding sets of switch units 560 and 570 is equipped with a master relay coil 552, which is energized or not depending upon whether the sensitive relay 600 of the translating unit is closed or open. Further each one of said groups of switch units, except the first, is equipped with a second master relay coil 552A, as illustrated. The purpose of these second master relay coils 552A is to move the respective switch units 560 and 570 from their no-signal positions to their dot positions whenever respective code-signals are received by the apparatus, regardless of whether such code-signals are dots or dashes.

In order to energize the proper one of these second master relay coils 552A upon the reception of a code-signal by the apparatus, an auxiliary step-switch 137—3 is provided. It is mechanically connected to, but electrically insulated from, the main step-switch 137, and is arranged to move simultaneously and correspondingly therewith.

The successive contact points of auxiliary step-switch 137—3 are electrically connected to the second master relay coils 552A associated with the respective successive groups of permutation switches 560 and 570. The #1 contact point is a blank for the reason that there is no second master relay coil associated with the first translating unit (there need be no no-signal condition registered by the permutation device because, when the machine is operating, there will always be at least one code-signal received for registering a letter or other symbol).

In the present instance, the contact finger 137—3h of the auxiliary step-switch 137—3 is not made broad, as is the contact finger 137—2h in the afore-referred-to copending application Serial No. 515,952, because the holding circuit accomplishes the purpose of such a broad contact finger.

Each switch unit 560 and 570, except the first, in any set is provided with a compound spring arrangement 551, having one component spring 551a which is relatively weaker than a second and shorter component spring 551b. Such compound spring arrangement is placed to act between the respective switch-arms 560a and 570a and the master relay coils 552 and 552A, thereby opposing the actions of such master relay coils. It should be noted that a master relay coil 552A is powerful enough, when energized, to close a holding switch-arm 560a relative to its dot contact point 560c and a letter or other symbol switch-arm 570a relative to its dot contact point 570c, but is not powerful enough to overcome the resistance of the combined action of both springs 551b and 551a. Thus, a switch-arm 560a is moved into engagement with its dot contact point 560c, and a switch-arm 570a is moved into engagement with its dot contact point 570c, whenever a corresponding code-signal is received by the apparatus, unless that code-signal is a dash. If the latter is true, closing of relay 600 of the translating unit energizes the master relay coil 552, which is powerful enough to overcome the combined resistance of springs 551b and 551a. This is required because, when the switch-arm 560a engages with the electrical contact 560d and when the step-switch contact finger 137—3h no longer connects with master relay coil 552A, master relay coil 552 alone holds the switch-arm 560a in its dash position against the combined resistance of springs 551a and 551b.

Release of the apparatus, upon the printing of a letter or other symbol registered by the permutation device, is accomplished in the same manner as hereinbefore set forth relative to the embodiment of Fig. 1.

With respect to the invention disclosed by this application, it should be noted that the regular voltage is set at a value of 2X volts, while the diode CD is set to charge the character condenser CC, in one unit of time, to a voltage value of X volts. Thus, there is a comparison, in the CRV triode of the translating unit, of X volts with 2X volts for a dot signal, and of 3X volts with 2X volts for a dash signal. It should be noted that, this way, a wide margin of error in code transmission can take place without disturbing the accuracy of the apparatus.

Whereas this invention is here described with respect to preferred specific forms thereof, it should be understood that various changes in said specific forms and various other specific forms may be made without departing from the generic spirit and scope of the invention as set forth in the specification, drawings, and accompanying claims.

I claim:

1. In code-controlled apparatus, means for establishing a regulator value representing the measure of a given type of code-space; means for measuring the time-length of a received code-signal at a rate which sets off the measured code-signal from the said regulator value even though the said given type of code-space and the said measured code-signal are actually equal in length; means for comparing a measured code-signal with said regulator value; and means responsive to the resultant of said comparison.

2. In code-controlled apparatus, a permutation device arranged to be variably set; a translating unit comprising means establishing a regulator value representing the measure of a given type of code-space, means for measuring the time-length of a received code-signal at a rate which sets off the measured code-signal from the said regulator value even though the said given type of code-space and the said measured code-signal are actually equal in length, means for comparing a measured code-signal with said regulator value; means responsive to the resultant of said comparison; means for connecting the said responsive means of said translating unit to said permutation device; and selective means arranged to be selectively actuated in accordance with the various settings of said permutation device.

3. In code-controlled apparatus, electrical means for establishing a regulator voltage representing the measure of a given type of code-space; an electrical condenser; a diode electronic tube arranged for charging the said condenser, during the reception of a code-signal by the apparatus, at a rate which builds up a charge across the condenser differing from the said regulator voltage even though the said given type of code-space and the said measured code-signal are actually equal in length; a triode electronic tube for comparing respective charges across the said condenser, representative of respective received code-signals, with the said regulator voltage; and a sensitive relay connected in the plate circuit of said triode so as to be actuated should the said comparison of voltages by the triode result in the flow of current in the plate circuit thereof.

4. Code-controlled apparatus, including in combination code-receiving means; a translating unit comprising a condenser, a diode electronic tube for charging the condenser, a triode electronic tube having filament, grid, and plate circuits, and a sensitive relay disposed in the plate circuit of said triode; electrical means establishing a regulator voltage, said means being connected with the filament circuit of said triode for feeding said regulator voltage thereinto; means connecting the positive side of said condenser to the grid of said triode so voltage from the charged condenser will feed into said grid; a permutation device having a plurality of electrical relays arranged to be variably set in accordance with the translated code, a power circuit controlled by said sensitive relay; means adapted to successively connect the said power circuit with successive relay units of said permutation device; and means for substantially instantaneously discharging said condenser.

5. In code-controlled apparatus, means for measuring each short code-space which occurs first in any group of successive code-signals received by the apparatus; means for holding the respective measurements made by said measuring means; means for establishing respective regulator values which are substantially equivalent to the respective measurements held by said holding means, for use during the respectively next subsequent groups of successive code-signals; means for measuring respective code-signals as they are received by the apparatus; means for comparing the respective code-signal measurements with the respective regulator values with which they are concerned; and means responsive to said comparing means.

6. In code-controlled apparatus, means for electrically measuring each short code-space which occurs first in any group of successive code-signals received by the apparatus; means for electrically holding the respective measurements made by said measuring means; means for establishing respective electrical regulator values which are substantially equivalent to the respective electrical measurements held by said holding means, for use during the respectively next subsequent groups of successive code-signals; means for electrically measuring respective code-signals as they are received by the apparatus; means for electrically comparing the respective code-signal measurements with the respective regulator values with which they are concerned; and means responsive to said comparing means.

7. In code-controlled apparatus, a single translating unit; regulator means providing standard regulator values which can be used as reference values in the remainder of the apparatus; a permutation device having a plurality of single switches arranged to be sequentially actuated by said single translating unit, each of said single switch elements except the first having three electrical contact points arranged to register, respectively, a no-signal condition, a received dot code-signal, and a received dash code-signal, and said single translating unit comprising means for comparing a received code-signal with the regulator value at any given time, and means responsive to said comparing means for properly setting the single switch element with which it is associated at that given time.

8. In code-controlled apparatus, means for receiving transmitted code-signals; electrical means controlled by the received code-signals for supplying individual charges of electricity which vary in accordance with the relative durations of the said received code-signals; adjustable means supplying a regulating charge of electricty; means for quantitatively comparing the respective individual charges with the said regulating charge; and result-producing means variably responsive to said charge-comparing means.

9. In code-controlled apparatus, means for receiving transmitted code-signals; electrical means controlled by the received code-signals for supplying individual charges of electricity which vary in accordance with the relative durations of the said received code-signals; adjustable means supplying a regulating charge of electricity; means for quantitatively comparing the respective individual charges with the said regulating charge; result-producing means variably responsive to said charge-comparing means; and means for automatically adjusting said regulating charge supplying means in accordance with variations in speed of code transmission.

ARTHUR C. WINTER.